(12) United States Patent
Rovelli

(10) Patent No.: US 9,012,004 B2
(45) Date of Patent: Apr. 21, 2015

(54) FLUID TIGHT TAPE FOR COOKING UNDER VACUUM

(71) Applicant: Claudio Rovelli, Concorezzo (IT)

(72) Inventor: Claudio Rovelli, Concorezzo (IT)

(73) Assignee: Plastar Pak S.R.L. (IT)

( * ) Notice: Subject to any disclaimer, the term of this patent is extended or adjusted under 35 U.S.C. 154(b) by 20 days.

(21) Appl. No.: 13/684,659

(22) Filed: Nov. 26, 2012

(65) Prior Publication Data

US 2013/0142992 A1 Jun. 6, 2013

(30) Foreign Application Priority Data

Dec. 2, 2011 (IT) .............................. VR2011A0215

(51) Int. Cl.
| | | |
|---|---|---|
| *B32B 3/24* | (2006.01) | |
| *B32B 3/30* | (2006.01) | |
| *B32B 25/04* | (2006.01) | |
| *C09J 7/02* | (2006.01) | |
| *B65D 33/00* | (2006.01) | |

(Continued)

(52) U.S. Cl.
CPC ............... *C09J 7/02* (2013.01); *B65D 81/2007* (2013.01); *B65D 33/00* (2013.01); *B32B 2405/00* (2013.01); *B32B 25/042* (2013.01); *B32B 2307/306* (2013.01); *B32B 2307/514* (2013.01); *C09J 7/0264* (2013.01); *B32B 3/266* (2013.01); *C09J 7/026* (2013.01); *B32B 3/30* (2013.01); *B65D 81/2023* (2013.01); *B65D 81/3438* (2013.01)

(58) Field of Classification Search
USPC .......................................................... 383/96
See application file for complete search history.

(56) References Cited

U.S. PATENT DOCUMENTS 2,704,075 A * 3/1955 Cherkin ......................... 604/408
3,306,563 A * 2/1967 Soto ................................. 156/60

(Continued)

FOREIGN PATENT DOCUMENTS

DE 60223891 11/2008
EP 2062542 A1 * 5/2009 ............. A61B 17/08

(Continued)

OTHER PUBLICATIONS

Machine Translation of EP 2062542 A1—equivalent to FR 2831144 A1, Apr. 2003.*

(Continued)

*Primary Examiner* — Jeff Vonch
(74) *Attorney, Agent, or Firm* — Ostrolenk Faber LLP

(57) ABSTRACT

The present invention relates to a fluid tight tape for a perforable package or packet, which perforable package or packet is particularly suitable for containing under vacuum foodstuff to be thermally treated, comprising:
- a laminar body (2), made of elastically deformable material and resistant to relatively high temperatures, designed to be applied to the perforable package or packet suitable for containing the foodstuff to be thermally treated;
- a glue means (4) provided at one face of the laminar body (2) facing, in use, the package or packet, the glue means (4) being designed to make the laminar body (2) tightly adhere to the package or packet, the laminar body (2) having a bare area (5), lacking glue, at which a through opening (6) is obtained. The fluid tight tape comprises an elastic insert member (7) tightly housable in and anchorable to the through opening (6) of the laminar body (2), the elastic insert member (7) being designed to remain, in use, adjacent to or in contact with the package or packet with no interposition of the glue means (4).

4 Claims, 1 Drawing Sheet

(51) Int. Cl.
*B65D 81/34* (2006.01)
*B65D 81/00* (2006.01)
*B65D 81/20* (2006.01)
*B32B 3/26* (2006.01)

(56) References Cited

U.S. PATENT DOCUMENTS

| | | | | |
|---|---|---|---|---|
| 3,659,584 | A | | 5/1972 | Doyle et al. .................. 126/369 |
| 3,879,586 | A | * | 4/1975 | DuRocher et al. ............ 200/5 A |
| 4,632,673 | A | * | 12/1986 | Tiitola et al. ................. 604/415 |
| 4,698,061 | A | * | 10/1987 | Makaryk et al. .............. 604/408 |
| 4,919,955 | A | * | 4/1990 | Mitchell ........................ 426/394 |
| 4,988,341 | A | * | 1/1991 | Columbus et al. ............ 604/306 |
| 5,728,071 | A | * | 3/1998 | Watson et al. ................. 604/180 |
| 5,853,094 | A | * | 12/1998 | Tanaka et al. ................. 215/247 |
| 6,070,397 | A | * | 6/2000 | Bachhuber ..................... 53/512 |
| 6,737,596 | B1 | * | 5/2004 | Hein .............................. 200/310 |
| 2006/0096661 | A1 | * | 5/2006 | Chaude ......................... 141/329 |
| 2007/0293888 | A1 | * | 12/2007 | Harren et al. ................. 606/201 |
| 2010/0242407 | A1 | * | 9/2010 | Binger et al. .................. 53/405 |

FOREIGN PATENT DOCUMENTS

| | | | | |
|---|---|---|---|---|
| FR | 2593144 | A1 | * 7/1987 | ................ A61J 1/00 |
| FR | 2831144 | A1 | * 4/2003 | ............ B65D 47/38 |
| FR | 2956388 | | 8/2011 | |
| JP | 2000272653 | A | * 10/2000 | ............ B65D 53/06 |
| JP | 2008030792 | A | * 2/2008 | |
| KR | 2010092093 | A | * 8/2010 | |
| WO | WO 2004/108557 | | 12/2004 | |

OTHER PUBLICATIONS

Machine Translation of EP 2062542 A1, May 2009.*
Machine Translation of KR 2010092093 A, Aug. 2010.*
Search Report issued by European Patent Office in connection with corresponding application No. VR2011A00215, Jul. 2012.

* cited by examiner

FLUID TIGHT TAPE FOR COOKING UNDER VACUUM

FIELD OF THE INVENTION

The present invention relates to a fluid tight tape designed to be applied to a perforable package or packet, which perforable package or packet is particularly suitable for containing under vacuum foodstuff to be thermally treated.

BACKGROUND OF THE INVENTION

Cooking under vacuum is a cooking technique for foodstuffs that consists of cooking—at temperatures usually comprised between 70 and 100° C.—foodstuffs previously placed into specific packages or packets made of polymer material. These packages or packets are typically polyethylene bags with external nylon covering, wherein vacuum has been previously obtained by suitable means.

The cooking of such foodstuffs can be carried out in a humid environment (e.g. by boiling), in a steam oven or microwave oven.

One particular feature of this type of cooking is that there is no direct contact between the cooked foodstuffs, which are contained in the package under vacuum, and the cooking means. This allows avoiding losses of water from the foodstuffs, which thus preserve their tenderness as well as many other desired characteristics.

Other advantages are obtained with this type of cooking. Cooking under vacuum also avoids direct contact of the foodstuff with external contamination sources and therefore ensures greater sanitary-hygienic safety. The preservation time of cooked foodstuffs is also extended up to 20 days if, after cooking, the foodstuffs are preserved in their package under vacuum at temperatures lower than 3° C.

In order to be sure that a foodstuff is correctly cooked under vacuum, it is necessary to verify that the so-called "core" temperature of the foodstuff, i.e. in the most inner part thereof, reaches and maintains a temperature of about 90° C. for a specific time interval. This assessment is carried out during foodstuff cooking by means of temperature sensor means, e.g. a needle probe, which is inserted through the package until it penetrates into the foodstuff contained therein, in order to measure the temperature thereof.

In order to ensure the maintenance of the fluid tight characteristic of the package containing the foodstuff, even after the penetration of the needle probe, which pierces the package during the temperature measurement, a so-called fluid tight tape is previously applied on the package, at the point where the probe is expected to pierce the package. Such fluid tight tape is typically a strip of material with adhesive surface applied to the package and equipped with sufficient heat resistance and elasticity such as to elastically yield, so that once the needle probe has been removed from the package, the tape automatically tightly closes the hole formed by the probe in such a way that the entrance of air into the package is prevented. Examples of material used for obtaining this type of tape are expanded silicone and neoprene. Thanks to such a fluid tight tape, the package is maintained fluid tight even after repeated insertions/removals of the temperature needle into/from the package.

The limit of this type of tape is the fact that, since it is typically made of non-adhesive materials, one must provide for a glue means on the contact surface of the tape with the package in order to ensure, in use, a perfect adherence to the package. There is the risk that, during the step of temperature measurement, while the probe penetrates the tape, the glue and the package, it brings some glue with it inside the package, with foodstuff contamination effects.

SUMMARY OF THE INVENTION

Hence, the main object of the present invention is to provide a fluid tight tape for cooking under vacuum that, in use, does not contaminate the foodstuffs placed inside the package to which it is applied.

Another object of the present invention is to provide a fluid tight tape for cooking under vacuum that is simple to manufacture and obtainable at competitive costs.

These and other objects, which will be clearer below, are achieved by a fluid tight tape for a perforable package or packet, which perforable package or packet is particularly suitable for containing under vacuum foodstuff to be thermally treated, comprising:
  a laminar body, made of elastically deformable material and resistant to relatively high temperatures, designed to be applied to said perforable package or packet suitable for containing said foodstuff to be thermally treated;
  a glue means provided at one face of said laminar body facing, in use, said package or packet, said glue means being designed to make said laminar body tightly adhere to said package or packet,
said laminar body having a bare area, lacking glue, at which a through opening is obtained and
characterized in that
it comprises an elastic insert member tightly housable in and anchorable to said through opening of said laminar body, said elastic insert member being designed to remain, in use, adjacent to or in contact with said package or packet with no interposition of said glue means.

BRIEF DESCRIPTION OF THE DRAWINGS

Further aspects and advantages of the present invention will be more clear from the following detailed description of several currently preferred embodiments thereof, illustrated as merely exemplifying and non-limiting in the enclosed drawing, wherein.

In the drawing set, equivalent or similar parts or components were assigned with the same reference numerals.

DETAILED DESCRIPTION OF THE INVENTION

Figure 1:
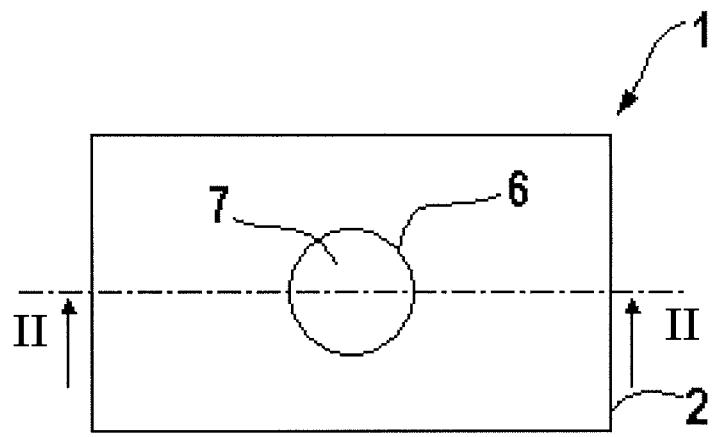
FIG. 1 illustrates a plan view of a fluid tight tape for cooking foodstuffs under vacuum according to the present invention.
Figure 2:
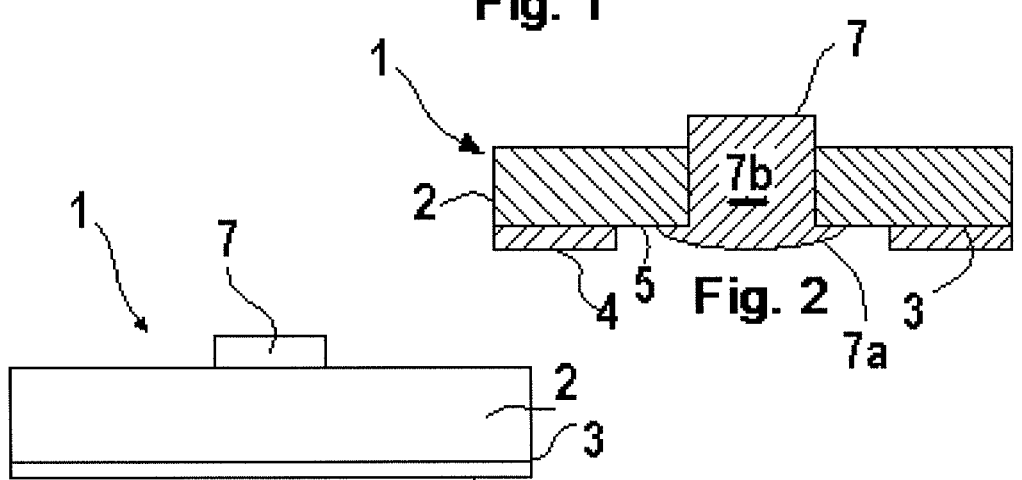
FIG. 2 is a cross section view taken along trace II-II of FIG. 1.
Figure 3:
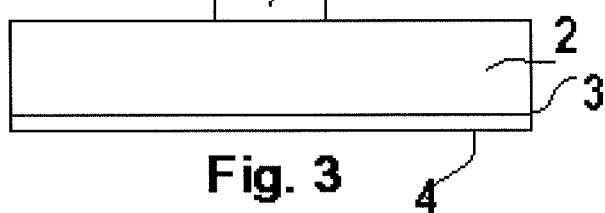
FIG. 3 shows a side view of the tape of FIG. 2.

With reference first, to FIGS. 1 to 3, it is observed that a fluid tight tape for cooking under vacuum according to the present invention is generically indicated with reference numeral 1 and comprises a laminar body 2, preferably made of flexible material, having quadrangular, circular or polygonal contour. Such laminar body is made of rubber for foodstuff use, e.g. food-certified silicone or any other suitable material resistant to relatively high temperatures, at least on the order of 100° C. (i.e. typically the cooking temperatures of foodstuffs in general), and flexible and elastically deformable such that once a needle probe, which previously perforated the body is removed, the hole left by the probe is closed in an air-tight manner.

The laminar body 2 of the tape 1 is intended to be fixed at one face 3 thereof, by means of a suitable fixing glue means 4, to the outer surface of a package or packet under vacuum, the package or packet being made of a polymeric material (not illustrated in the drawings and of any one suitable type) containing a foodstuff to be cooked according to the above mentioned modes. The fixing means 4 comprises, for example, a glue material layer or a double-sided adhesive of any suitable type, which in use ensures the permanent adhesion, even hot adhesion, of the tape body 2 to a package under vacuum containing one or more foodstuffs.

More particularly, the fixing means or glue 4 is applied to one face or surface 3 of the body 2, which in use is intended to come into contact with the material of the package or packet under vacuum. However, the fixing means or glue 4 is distributed on the face 3 in a manner so as to delimit an internal area or zone 5 that is bare or lacking glue.

At the bare area 5, a through opening 6 is obtained, typically a through hole, preferably provided at a central position of the body 2. The through opening 6 acts as a receiving seat for an elastic and hermetic insert member 7 tightly housable and anchorable therein and, in use, intended to be adjacent to or in contact with the package or packet under vacuum without the interposition of glue, given the bare area 5 lacking glue. The bare area 5 has a greater area than that of the through opening 6 (or it is at least equal thereto), so as to ensure that the insert member end 7a is housed in the through opening, very near to or exiting therefrom, and it does not comes into contact with the fixing means or glue 4.

The insert member 7 is intended to be perforated, even hot perforated, together with the wall adjacent thereto or in contact with a package or packet under vacuum, by the needle of a thermal probe in order to carry out temperature measurements for a (foodstuff) product contained in the package. Due to the fact that the insert member 7 is made of elastic material, once the needle of the thermal probe is extracted, the zone around the perforation—previously obtained in such member by the probe needle—will be stretched; in such a way that the perforation will be automatically tightly closed. At the same time, due to the presence of the bare area or zone 5 without glue around the through opening 6, there is no longer the risk that glue can be transferred by the probe needle to the under vacuum package interior.

The insert member 7 can have different configurations. Thus, for example, in FIG. 2 it has a (substantially cylindrical) stem 7b, whose end 7a is configured with enlarged head intended to be peripherally abutted against the bare area or zone 5 around the edge of the through opening 6. In this case, the stem is preferably forced into the through opening (hole) 6.

Figure 4:
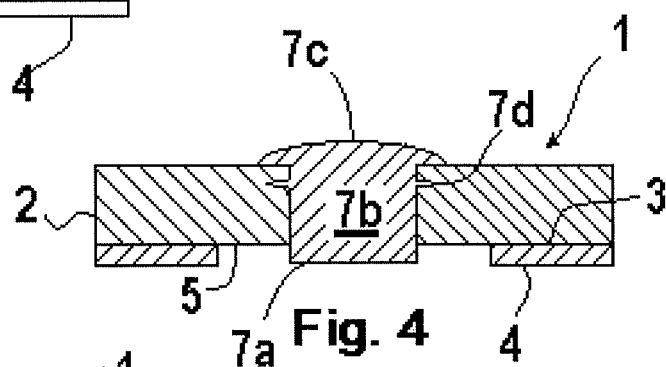
FIG. 4 illustrates a cross sectional view of a variant of the fluid tight tape according to the invention.

In FIG. 4, an insert member 7 is illustrated with end 7c, opposite to the end 7a, configured with enlarged abutment head, whereas the stem 7b has an annular rib or a relief (or a channel or a groove) 7d for the snap engagement with an annular channel (or with a rib or a relief, respectively) provided in the through opening 6.

Figure 5:
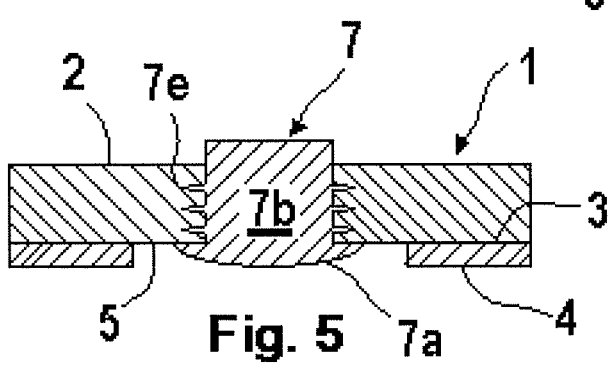
FIG. 5 shows a cross sectional view of another variant of the fluid tight tape according to the invention.

According to the variant illustrated in FIG. 5, the insert member is configured as in FIG. 2, but its stem is covered with a succession of ribs and grooves 7e suitable for ensuring good engagement with the wall of the housing through opening 6.

Advantageously, the insert member will have different color and/or tone with respect to the laminar body 2 of the fluid tight tape in order to allow the user who intends to insert the needle of a needle probe to more quickly find its location.

The fluid tight tape described above is susceptible to numerous modifications and variants within the protective scope defined by the following claims.

The invention claimed is:

1. A fluid tight tape comprising:
   a laminar body, made of elastically deformable and heat-resistant material; and
   a glue provided on one face of said laminar body,
   said laminar body having a bare area, lacking glue, on said one face of said laminar body, in which a through opening is made and
   wherein
   said laminar body has an elastic insert member which may be perforated and is tightly housable in and anchorable to said through opening of said laminar body, said elastic insert member not being in contact with said glue, and
   said insert member comprises a stem having one end configured as an enlarged head designed to be abutted against said bare area around the through opening, the enlarged head having a flat surface which is designed to be abutted against said bare area and having a curved surface opposite said flat surface.

2. The fluid tight tape according to claim 1, wherein said insert member has a stem with a rib or a relief or with an annular channel or groove for the snap engagement with an annular channel or with a rib or a relief provided in the through opening respectively.

3. The fluid tight tape according to claim 1, wherein said insert member has a stem provided with a succession of ribs and grooves.

4. A fluid tight tape comprising:
   a laminar body, made of elastically deformable and heat-resistant material; and
   a glue provided on one face of said laminar body,
   said laminar body having a bare area, lacking glue, on said one face of said laminar body, in which a through opening is made and wherein
   said laminar body has an elastic insert member which may be perforated and is tightly housable in and anchorable to said through opening of said laminar body, said elastic insert member filling said through opening of said laminar body and said elastic insert member comprising a stem having one end configured as an enlarged head having a flat surface designed to be abutted against said bare area around said through opening and having a curved surface opposite said flat surface.

\* \* \* \* \*